United States Patent
Takeda et al.

(10) Patent No.: US 9,519,146 B2
(45) Date of Patent: Dec. 13, 2016

(54) VIRTUAL IMAGE DISPLAY APPARATUS

(71) Applicant: SEIKO EPSON CORPORATION, Tokyo (JP)

(72) Inventors: Takashi Takeda, Suwa (JP); Takahiro Totani, Suwa (JP); Masayuki Takagi, Shiojiri (JP); Akira Komatsu, Tatsuno-Machi (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 180 days.

(21) Appl. No.: 14/078,931

(22) Filed: Nov. 13, 2013

(65) Prior Publication Data

US 2014/0139404 A1    May 22, 2014

(30) Foreign Application Priority Data

Nov. 20, 2012  (JP) ................................ 2012-253929

(51) Int. Cl.
*G02B 27/01*  (2006.01)

(52) U.S. Cl.
CPC ... *G02B 27/0172* (2013.01); *G02B 2027/0141* (2013.01)

(58) Field of Classification Search
CPC ......... G02B 26/08; G02B 26/10; G02B 27/01; G02B 27/02; G02B 27/017; H04N 5/74
See application file for complete search history.

(56) References Cited

U.S. PATENT DOCUMENTS

| | | | |
|---|---|---|---|
| 5,023,641 A * | 6/1991 | Merrick | 396/88 |
| 6,046,720 A * | 4/2000 | Melville et al. | 345/108 |
| 2001/0000124 A1* | 4/2001 | Kollin et al. | 345/8 |

(Continued)

FOREIGN PATENT DOCUMENTS

| JP | A-2007-199251 | 8/2007 |
|---|---|---|
| JP | 2008-040037 A | 2/2008 |

(Continued)

OTHER PUBLICATIONS

LensFocalLength.pdf A downloadable web publication, with one of the versions archived on Dec. 1, 2008 as show in the following website: https://web.archive.org/web/20081201190000/http://www.d.umn.edu/~mharvey/th1501ellipsoidals.html.*

(Continued)

*Primary Examiner* — Amr Awad
*Assistant Examiner* — Wing Chow
(74) *Attorney, Agent, or Firm* — Oliff PLC

(57) ABSTRACT

Image light is formed of light flux components having a diameter of, e.g., 3 mm or smaller. The image light is then caused to be incident on the iris of an eye to form an image in the form of a virtual image. The position where the principal rays of the light flux components that form the image light intersect one another is set to be a position shifted from the position of the iris of the eye toward the retina. The range of the light flux components that reach the retina can thus be changed in accordance with the motion of the eye. As a result, in accordance with a change in the line of sight that occurs when a wearer moves the line of sight in a specific direction, the image light can be so controlled that only image light components in the specific direction reach the retina of the eye.

11 Claims, 11 Drawing Sheets

(56) References Cited

U.S. PATENT DOCUMENTS

| | | | |
|---|---|---|---|
| 2002/0109819 A1* | 8/2002 | Tuval | 351/206 |
| 2007/0052672 A1* | 3/2007 | Ritter et al. | 345/156 |
| 2007/0171497 A1 | 7/2007 | Ishihara et al. | |
| 2010/0097580 A1 | 4/2010 | Yamamoto et al. | |
| 2012/0280956 A1 | 11/2012 | Yamamoto et al. | |

FOREIGN PATENT DOCUMENTS

| | | |
|---|---|---|
| JP | A-2009-122550 | 6/2009 |
| JP | 2012-013940 A | 1/2012 |
| WO | 2009066475 A1 | 5/2009 |

OTHER PUBLICATIONS

Wiki_Angleofview.pdf A downloadable web publication, with one of the versions archived on Mar. 1, 2010 as show in the following website: http://web.archive.org/web/20100301141205/http://en.wikipedia.org/wiki/Angle_of_view.*

* cited by examiner

VIRTUAL IMAGE DISPLAY APPARATUS

BACKGROUND

1. Technical Field

The present invention relates to a virtual image display apparatus, such as a head-mounted display worn around the head for use.

2. Related Art

In recent years, as a virtual image display apparatus that allows formation and observation of a virtual image, such as a head-mounted display, there is, for example, a proposed scanning image display apparatus in which the retina of each eye is so scanned with image light that an image is projected onto the retina (retina projection display apparatus), and the apparatus allows continuous observation of video images and character information by tracking motion of the eye and changing the scan direction accordingly (see JP-A-2009-122550). There is also a proposed scanning image display apparatus in which a diffraction optical element is disposed in the optical path to adjust light fluxes in such a way that the angle of divergence of a light flux in a specific direction is greater than those of light fluxes in the other directions for reduction in loss of light from a light source (see JP-A-2007-199251).

However, in JP-A-2009-122550, which always tracks motion of the eyes and provides video images in accordance with the tracking result, even when the wearer, for example, temporarily averts the eyes from video images, the video images remain visible irrespective of the motion of the eyes, which may bother the wearer in some cases. On the other hand, in JP-A-2007-199251, in which a diffraction optical element is disposed in the optical path or the diffraction optical element is followed by another optical system, the portion of the apparatus in front of the eye tends to be large and heavy. Further, in this case, it is sometimes difficult to achieve a see-through configuration that allows image light that forms a virtual image to be superimposed on outside light that is light from the outside.

SUMMARY

An advantage of some aspects of the invention is to provide a virtual image display apparatus that adjusts light fluxes to change a recognizable range of an image in accordance with the light of sight from the eyes of a wearer who is a user of the apparatus so as to allow the user to recognize video images according to the line of sight of the user without an increase in size of the apparatus.

A virtual image display apparatus according to a first aspect of the invention includes: (a) an image formation unit that causes image light having a predetermined light flux diameter to be incident on the iris of a user's eye so as to allow the user to visually recognize an image in the form of a virtual image, and (b) the image formation unit sets a position where principal rays of light flux components of the image light incident on the iris of the eye intersect one another to be a position shifted from an intended iris position where the iris of the eye is to be disposed toward a projection position where the retina of the eye is to be disposed.

In the virtual image display apparatus described above, adjusting the light flux diameter and a focus position (convergence position) of the image light when the image formation unit forms an image in the form of a virtual image allows the range of the image light that can reach the retina of the eye of the user (wearer) who wears the apparatus, that is, an image light display range to be changed in accordance with the line of sight from the eye. In particular, when the position where the light flux components of the image light are focused is set to be a position shifted from an intended iris position where the iris of the eye of the user who wears the apparatus should be located toward a projection position where the retina should be located, that is, toward the retina, the image light is not focused into a single point when passing through the pupil of the eye, whereby the range of the light flux components that reach the retina can be changed in accordance with the motion of the eye. As a result, for example, the image light can be so controlled that only components of the image light that correspond to a specific direction or a direction in the vicinity thereof reach the retina of the eye in accordance with a change in the line of sight that occurs when the user moves the line of sight in the specific direction in order to observe specific video images, whereby video images according to the line of sight of the user (user's intention) can be provided and video images from which the user averts the line of sight, that is, other unnecessary video images can be removed from the sight so that they do not interfere with the observation.

In a specific aspect of the invention, the image formation unit, when forming the image light, sets the position where the principal rays of the light flux components of the image light incident on the iris of the eye intersect one another to be a position shifted from the intended iris position toward the projection position described above but upstream of an intended center position corresponding to the center of pivotal motion of the eye. In this case, the range over which the image light falls within the sight of the user or not can be adequately changed in accordance with the motion of the line of sight. Further, the image light can be efficiently introduced through the iris.

In another aspect of the invention, the image formation unit adjusts the predetermined light flux diameter in such a way that the diameter of each of the light flux components that corresponds to a pixel is smaller than a maximum diameter of the pupil of the eye. In this case, making each of the light flux components that corresponds to a pixel sufficiently thin allows more adequate choice of whether or not video images are visible in accordance with the line of sight.

In still another aspect of the invention, the image formation unit adjusts the predetermined light flux diameter in such a way that the diameter of each of the light flux components that corresponds to a pixel is 3 mm or smaller. In this case, the diameter of each of the light flux components can be smaller than a maximum diameter of the pupil of a typical eye.

In yet another aspect of the invention, the image formation unit sets a reference direction to be a normal vision direction of the eye of the user who wears the apparatus and outputs the image light having a predetermined angular range with respect to the normal vision direction to cause the image light to be incident on the intended iris position in such a way that the components of the image light contain components within an angular range that allows the components to reach the projection position described above corresponding to the position of the retina of the eye and components within an angular range that does not allow the components to reach the projection position in accordance with where an incidence opening corresponding to the attitude of the eye is disposed. In this case, video images provided when the user faces in the normal vision direction can be different from video images provided when the user faces in a direction different from the normal vision direction.

In still yet another aspect of the invention, the image formation unit has a first display area that outputs light within an angular range that allows the light to reach the projection position described above when the eye faces in a first sight line direction corresponding to the normal vision direction of the eye of the user who wears the apparatus and a second display area that outputs light within an angular range that allows the light to reach the projection position when the eye faces in a second sight line direction different from the normal vision direction, and the image formation unit allows visual recognition of a virtual image formed by the image light in at least one of the first and second display areas. The sight line direction means the direction along which the center of the incidence opening and the center of the projection position described above are arranged. In this case, individual video images can be provided at least in one of a case where the user faces in the first sight line direction and a case where the user faces in the second sight line direction.

In further another aspect of the invention, the second display area of the image formation unit outputs light within an angular range that does not allow the light to reach the projection position when the eye faces in the first sight line direction. In this case, video images formed, for example, in the second display area are not recognized when the user's eye faces in the first sight line direction and recognized only when the user's eye faces in the second sight line direction.

In still further another aspect of the invention, in the image formation unit, the first display area is formed with respect to the first sight line direction corresponding to 0° in such a way that the first display area falls within viewing angles of ±10°. In this case, setting a reference direction (first sight line direction) to be a forward direction having a viewing angle of 0° and forming the first display area with respect to the reference direction in such a way that the first display area falls within viewing angles of ±10° allows the user to more adequately capture video images displayed in the first display area. More specifically, forming the first display area that falls within viewing angles of ±10° allows the user to read, for example, character information displayed in the first display area without moving the line of sight.

In yet further another aspect of the invention, the virtual image display apparatus further includes an input reception section that receives an instruction from the user and a display selection section that allows selection of whether or not image formation is performed at least in one of the first display area and the second display area of the image formation unit in accordance with the instruction from the input reception section. In this case, for example, an instruction from the user can be received by the input reception section, and video images or any other images can be displayed in the first display area in accordance with the instruction. That is, the user can intentionally select video images.

In still yet further another aspect of the invention, when a specific signal is inputted, the display selection section preferentially displays an image according to the specific signal irrespective of the instruction received by the input reception section. In this case, emergency information, such as notification of an imminent danger, can be displayed as higher-priority video image information than other types of video image information.

A virtual image display apparatus according to a second aspect of the invention includes: (a) an image formation unit that causes image light having a predetermined light flux diameter to be incident on the iris of an eye so as to allow visual recognition of a virtual image, and (b) the image formation unit allows visual recognition of the image light in such a way that the image light contains a component that is outputted at an angle that allows the component to reach a position corresponding to the retina of the eye only when the apparatus is worn and the light of sight from the eye faces in a specific direction.

The virtual image display apparatus described above can provide video images recognized only when the line of sight from the eye faces a specific direction, whereby video images according to the line of sight of a user (user's intention) can be provided and video images from which the user averts the line of sight, that is, other unnecessary video images can be removed from the sight so that they do not interfere with the observation.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A virtual image display apparatus according to a first embodiment of the invention will be described below in detail with reference to the drawings.

Figure 1:
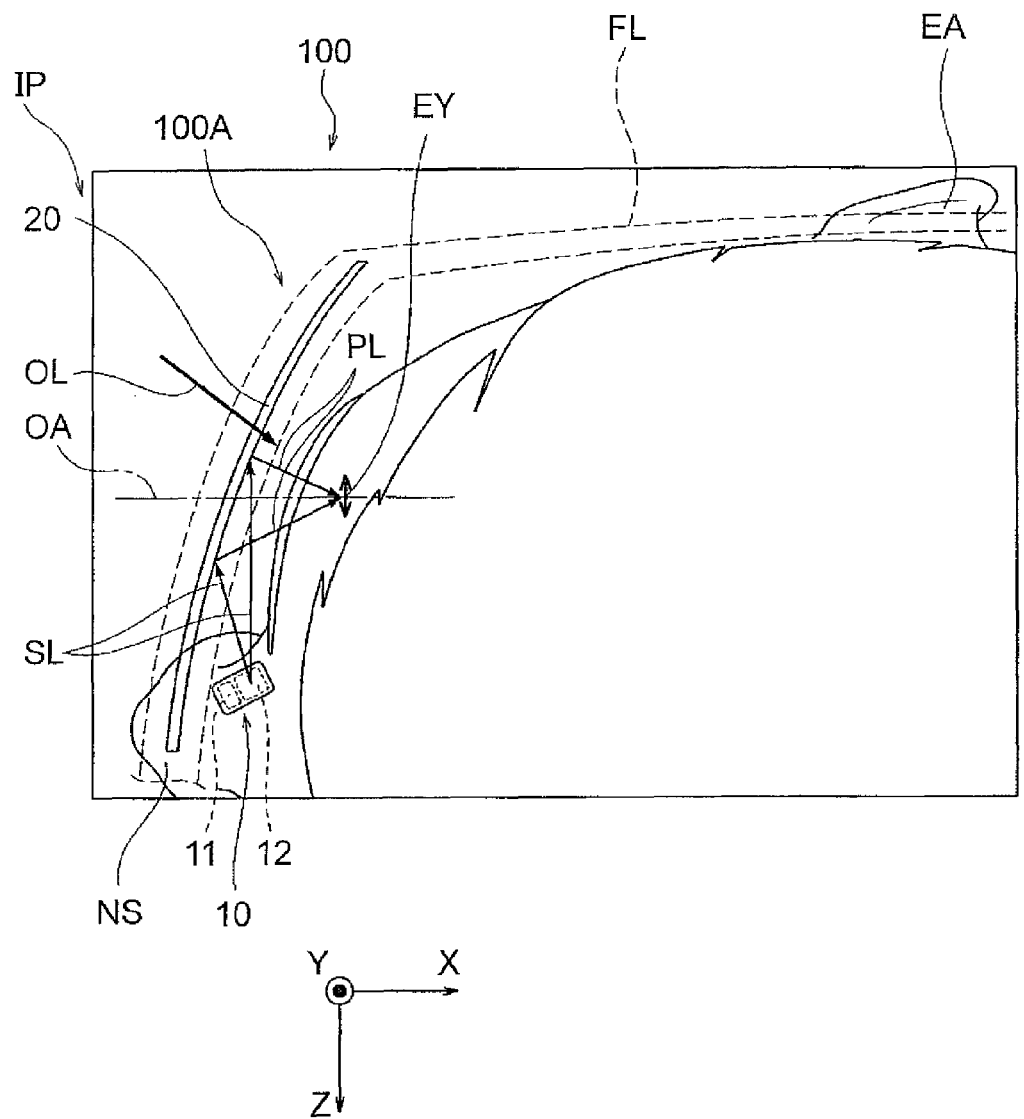
FIG. 1 shows a virtual image display apparatus according to a first embodiment.

A virtual image display apparatus 100 according to the embodiment shown in FIG. 1, which is a head-mounted display having a spectacle-like external appearance, not only allows a wearer (user), a viewer who wears the virtual image display apparatus 100, to recognize image light in the form of a virtual image but also allows the wearer, the user of the virtual image display apparatus 100, to view an image formed by outside light in see-through observation. FIG. 1 is a partial enlarged view showing a state in which the wearer wears the virtual image display apparatus 100, and part of the virtual image display apparatus 100 is omitted. Specifically, a first display unit 100A is part of the virtual image display apparatus 100 and forms a virtual image on the right-eye side. In the virtual image display apparatus 100, the first display unit 100A on the right-eye side is paired with a second display unit 100B on the left-eye side, as schematically shown, for example, in FIG. 2, but the second display unit 100B will not be described in detail because it has the same structure as that of the first display unit 100A and is simply a horizontally reversed version thereof. The first display unit 100A functions by itself as a virtual image display apparatus.

In the state shown in FIG. 1 and other figures, the direction oriented exactly frontward from the wearer is the direction of an optical axis OA, and X, Y, and Z directions are defined as follows: a +X direction is the direction in which the optical axis OA extends from the virtual image display apparatus 100 toward the wearer; ±Y directions are the upward and downward directions with respect to the wearer; and ±Z directions are the leftward and rightward directions with respect to the wearer.

An example of the structure of the virtual image display apparatus 100 will be described below by describing an example of the structure of the first display unit 100A. The first display unit 100A includes a light output section 10, which forms signal light and outputs the signal light in the form of scan light SL, and a virtual image formation section 20, which is an irradiated member that receives the scan light SL from the light output section 10 to form image light PL, as shown in FIG. 1. The light output section 10 is disposed in the vicinity of the wearer's nose NS, and the virtual image formation section 20 is disposed in front of the light output section 10 (on −X side) and covers an area in front of and corresponding to the wearer's eye EY.

Figure 2:
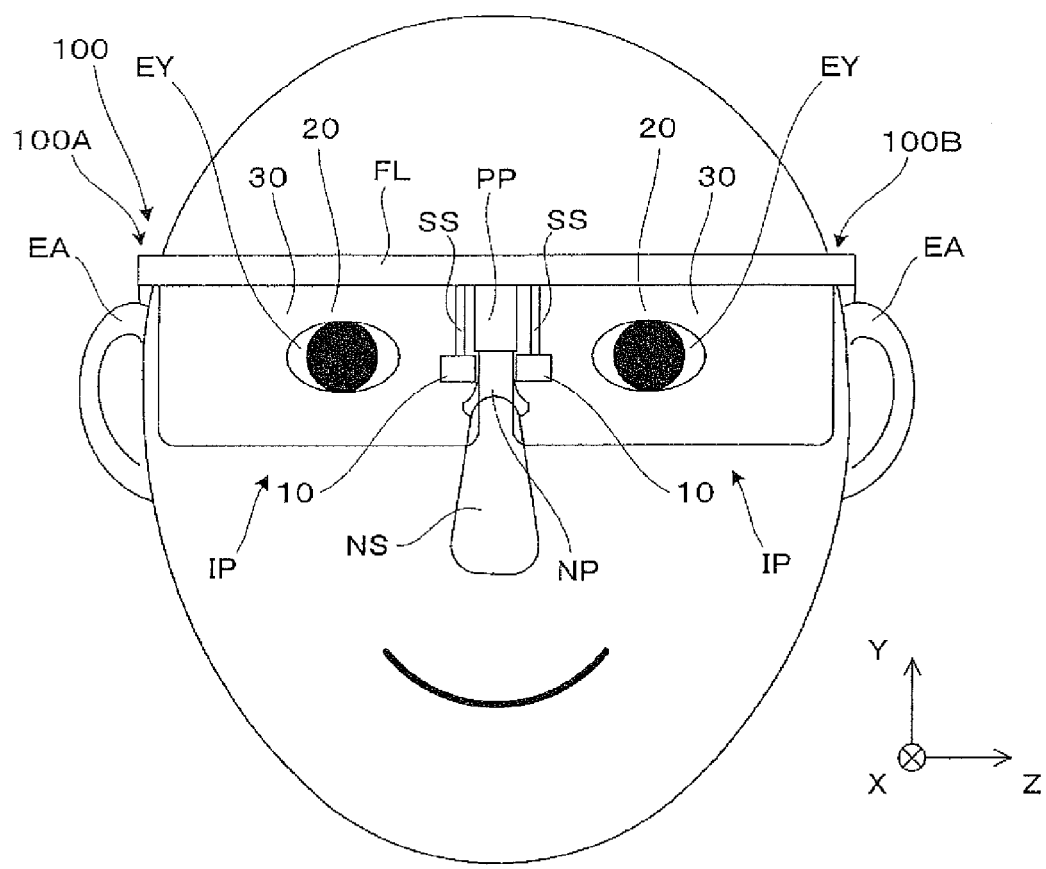
FIG. 2 is a front view schematically showing a state in which the virtual image display apparatus is worn.

In FIG. 2, which is a front view schematically showing a state in which the virtual image display apparatus 100 is worn, the light output section 10 is so supported by a support SS extending from a frame FL that the light output section 10 is disposed in a position in the vicinity of the nose NS on the +X side of the virtual image formation section 20 as described above. In the example shown in FIG. 2, the virtual image display apparatus 100 includes a pillar PP, which extends from a central portion of the frame FL and supports the virtual image formation section 20 in a sideways direction, and a nose pad NP, which is disposed at an end of the pillar PP and allows the nose NS to support the virtual image display apparatus 100 worn by the wearer. In the following description, the light output section 10 and the virtual image formation section 20 are collectively called an image formation unit IP. The image formation unit IP, which is formed of the light output section 10 and the virtual image formation section 20, causes the image light having a predetermined light flux diameter to be incident on the iris of the eye to allow the wearer to visually recognize an image in the form of a virtual image.

Figure 3A:
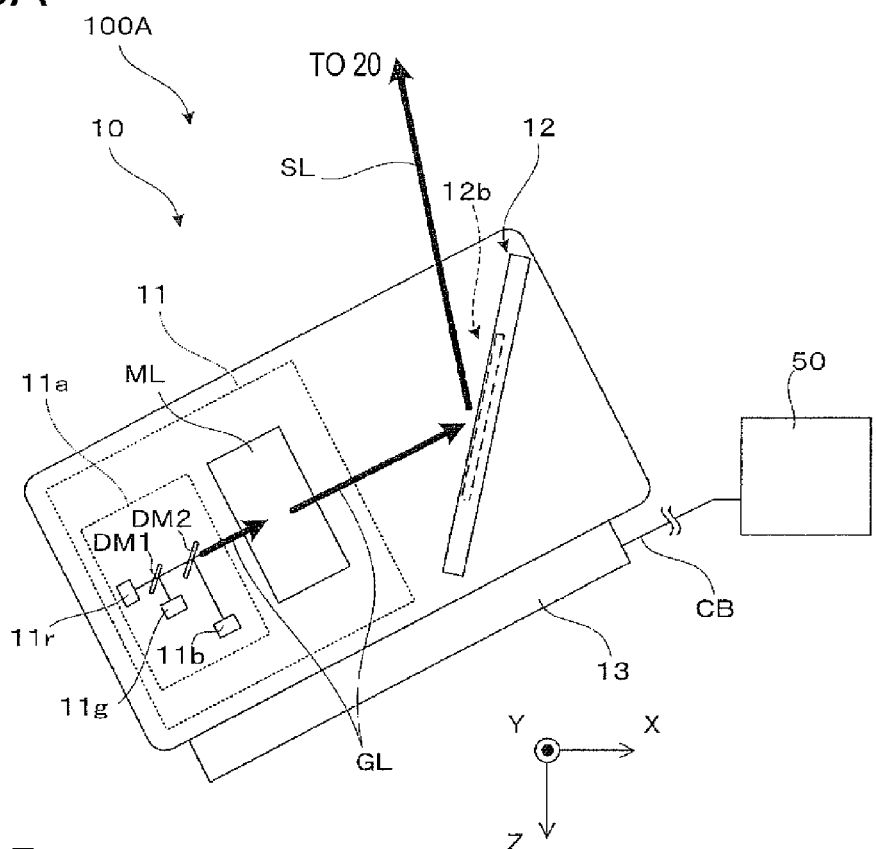
FIG. 3A describes an example of the structure of a light output section.
Figure 3B:
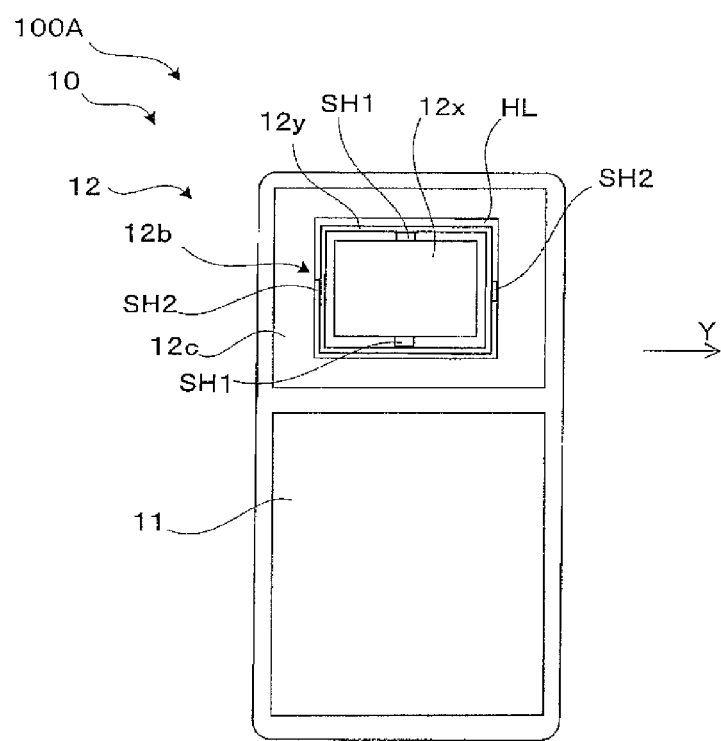
FIG. 3B shows the light output section shown in FIG. 3A but viewed in another direction.

The light output section 10 includes a signal light modulator 11, which is a signal light formation portion, a scan system 12, and a drive control circuit 13, as shown in FIGS. 3A and 3B. The virtual image display apparatus 100 further includes a controller 50 for controlling image formation, as shown in FIG. 3A. The controller 50 is connected to the light output section 10 via a cable CB. The controller 50 will be described later in detail.

The light output section 10 generates light for forming a virtual image by outputting light for image formation in accordance with an image signal among a variety of signals from the controller 50. Among the components of the light output section 10, the drive control circuit 13 drives and controls the light output section 10 in accordance with the image signal and a drive signal sent from the controller 50. That is, the drive control circuit 13 is a control circuit for driving the signal light modulator 11 and the scan system 12 in synchronization with each other in accordance with a variety of signals.

The configuration and action of the light output section 10 will be described below in detail. The signal light modulator 11 includes a combined light formation portion 11a and a collimator lens ML. The combined light formation portion 11a forms combined light that is signal light GL, which will form the image light PL (see FIG. 1). To this end, the combined light formation portion 11a includes color light sources 11r, 11g, and 11b, which emit red (R light), green (G light), and blue (B light) color light fluxes respectively, and first and second dichroic mirrors DM1, DM2, which combine the color light fluxes emitted from the color light sources 11r, 11g, and 11b. The collimator lens ML is a lens that adjusts the light flux state of the signal light GL, which is the combined light having exited out of the combined light formation portion 11a, to modulate the signal light GL and outputs the modulated signal light GL toward the scan system 12. The collimator lens ML, for example, substantially parallelizes the signal light GL. The scan system 12 includes a MEMS mirror 12b, which is a scanner that two-dimensionally scans the virtual image formation section 20 with the signal light GL having exited out of the collimator lens ML.

In the signal light modulator 11 among the components of the light output section 10, each of the color light sources 11r, 11g, and 11b is a diode laser light source or an LED light source. The red light source 11r emits light of a specific wavelength band that produces red light. The green light source 11g emits light of a specific wavelength band that produces green light. The blue light source 11b emits light of a specific wavelength band that produces blue light. Each of the color light sources 11r, 11g, and 11b is formed, for example, of an LED-type light emitting device that emits the corresponding color light flux. Each of the color light sources 11r, 11g, and 11b emits the corresponding color light flux with the direction of the light flux so adjusted that the light flux travels toward the first dichroic mirror DM1 or the second dichroic mirror DM2.

The first dichroic mirror DM1 transmits light of the specific wavelength band that produces red light and reflects light of the other specific wavelength bands, and the second dichroic mirror DM2 transmits light of the specific wavelength bands that produce red and green light and reflects light of the other specific wavelength band. The combined light, which is the combination of the three color light fluxes, the red light, the green light, and the blue light, is thus formed as the signal light GL, which will form a color image. In the case shown in FIG. 3A, the positions of the color light sources 11r, 11g, and 11b are so adjusted that the optical path lengths of the three color light fluxes to be combined are equal to one another. That is, the color light fluxes are equivalently positioned. Further, the size of the second dichroic mirror DM2 with respect to the size of the first dichroic mirror DM1 is also adjusted in accordance with the shape of each of the light fluxes.

Using the color light sources 11r, 11g, and 11b corresponding to the three colors, red (R light), green (G light), and blue (B light), to perform the combined light formation in the thus configured combined light formation portion 11a contributes to high light usage efficiency.

The collimator lens ML adjusts the angle of divergence of the signal light GL, which is the combined light formed by the combined light formation portion 11a, for example, converts the light flux into a substantially parallelized but slightly convergent light flux, and outputs the resultant signal light GL toward the MEMS mirror 12b, which is a scanner, in the scan system 12.

The scan system 12 includes the MEMS mirror 12b and a peripheral member 12c, as shown in FIG. 3B. The MEMS mirror 12b irradiates an irradiated area of the virtual image formation section 20 (see FIG. 1), which is the irradiated member, with the signal light GL having passed through the collimator lens ML in the form of the scan light SL to allow visual recognition of an image in the form of a virtual image. That is, the MEMS mirror 12b is a key portion of the scan system 12. The peripheral member 12c forms a hole HL, which surrounds the periphery of the MEMS mirror 12b to accommodate the MEMS mirror 12b. In other words, the MEMS mirror 12b is accommodated in the hole HL having a rectangular shape and provided in a central portion of the scan system 12. The MEMS mirror 12b can be inclined in an arbitrary direction.

The MEMS mirror 12b will be described below in detail. The MEMS mirror 12b is a scanner that outputs the signal light GL, which is the combined light formed by the signal light modulator 11, in the form of the scan light SL, with which the virtual image formation section 20 (see FIG. 1) is irradiated and two-dimensionally scanned. The MEMS mirror 12b is formed of a MEMS mirror main body 12x rotatable around a single axis and a mirror frame 12y surrounding the MEMS mirror main body 12x and rotatable around an axis perpendicular to the single axis in order to be capable of two-dimensional scanning. First, the MEMS mirror main body 12x has a pair of first shafts SH1 connected to the mirror frame 12y and is rotatable around the first shafts SH1. The mirror frame 12y has a pair of second shafts SH2 connected to the peripheral member 12c of the MEMS mirror 12b and is rotatable around the second shafts SH2. Since the axial direction of the first shafts SH1 and the axial direction of the second shafts SH2 are perpendicular to each other, the MEMS mirror main body 12x of the MEMS mirror 12b is rotatable around the two axes perpendicular to each other. The thus configured MEMS mirror 12b can be inclined in an arbitrary direction and allows two-dimensional scanning of a target object with the scan light SL, which is a beam to be outputted. That is, the MEMS mirror 12b is a MEMS scanner that irradiates the virtual image formation section 20 with the scan light SL.

It is noted that a relay lens for adjusting the angle of divergence of the light flux can be disposed on the light exiting side of the MEMS mirror 12b.

Referring back to FIG. 1, the virtual image formation section 20 is a transparent base member having a semi-transparent reflective film formed on a transparent substrate made of a resin. That is, the virtual image formation section 20 is a half-silvered mirror. The virtual image formation section 20 is assembled to the frame FL and disposed in a position in front of the wearer's eye EY and farther away from the wearer than the light output section 10. In other words, the light output section 10 is disposed between the wearer's eye EY and the virtual image formation section 20 in the direction along the optical axis OA. The virtual image formation section 20 has a size large enough to cover the wearer's eye EY from the front side, receives the scan light SL outputted from the scan system 12 in the light output section 10 and inclined toward the −X direction, reflects the scan light SL to form a virtual image, which is recognized by the wearer. The virtual image formation section 20 has a shape that follows the exterior appearance of the virtual image display apparatus 100 and is curved in accordance with the frame FL in the example shown in FIG. 1.

Further, the virtual image formation section 20, which is a half-silvered mirror, is a plate-shaped member having a substantially uniform thickness, not only forms a virtual image as described above but also transmits outside light OL. That is, not only the virtual image but also light from the outside reach the wearer's eye EY, which means that the virtual image display apparatus 100 has a see-through configuration.

Figure 4:
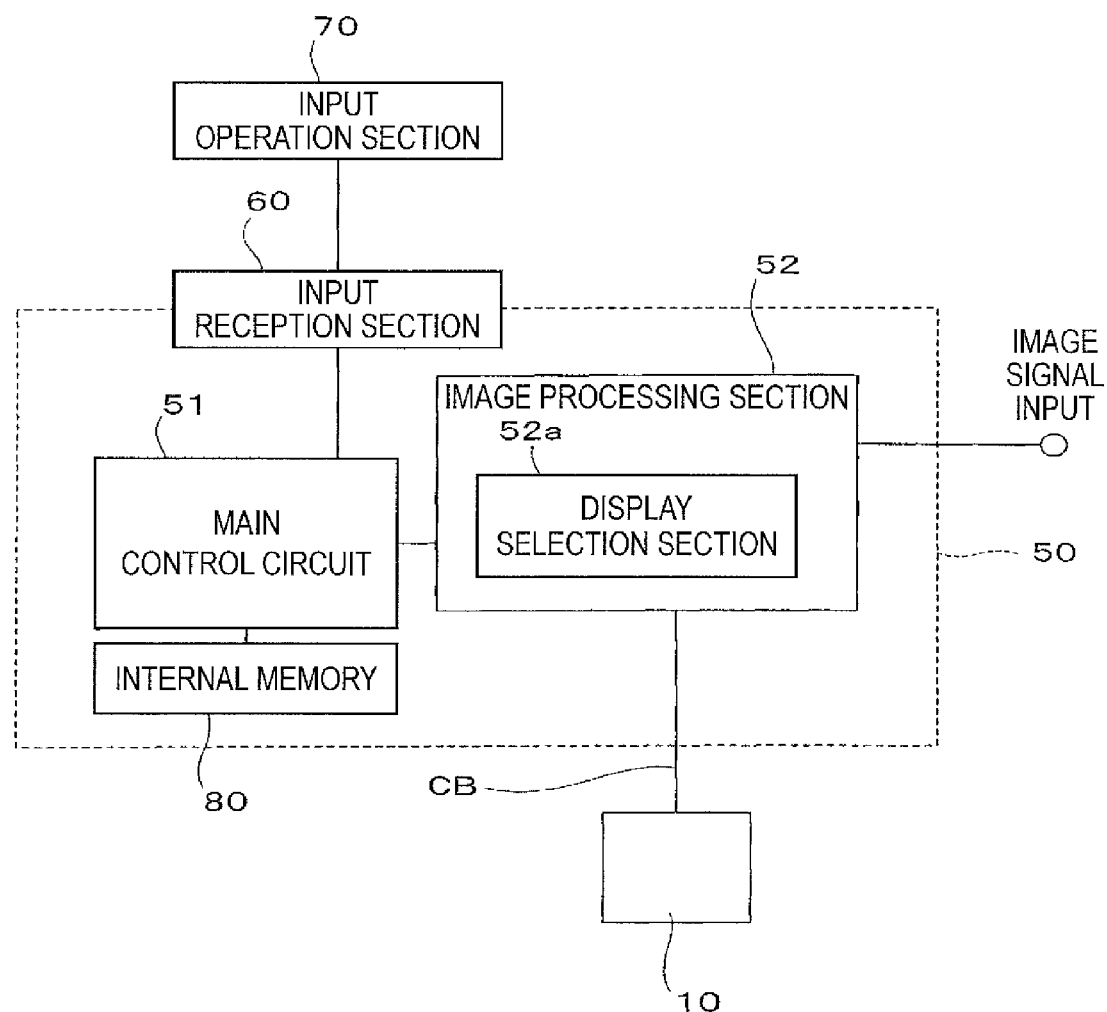
FIG. 4 is a block diagram for describing the structure of a controller in the virtual image display apparatus.

The structure of the controller 50 will be described below with reference to FIG. 4. The controller 50 includes a main control circuit 51, which oversees and controls the action of the controller 50, an image processing section 52, which performs image processing based on an externally inputted image signal, such as a video signal, an input reception section 60, which receives an external signal, such as an instruction from the wearer (operator), and an internal memory 80, which saves a variety of data on video images having fixed contents, such as icons. The controller 50 is disposed in a position where the controller 50 does not block the sight of the wearer or increase the weight of the portion of the apparatus in front of the eye, for example, in a position behind the ear EA (see FIG. 1) or a position inside an operation panel (not shown) that allows the wearer to operate the apparatus in a variety of ways, for example, by accommodating the cable CB in the frame FL, the support SS, and other components shown in FIG. 2 and extending the cable CB.

The image processing section 52 creates a variety of signals related to images and audio based, for example, on an externally inputted signal and sends the created signals to the light output section 10 via the cable CB. That is, the variety of signals related to images and audio are transmitted from the image processing section 52 to the drive control circuit 13 (see FIG. 3A) in the light output section 10. The image processing section 52 includes a display selection section 52a. The display selection section 52a selects the content of a displayed image in a variety of ways. The display selection section 52a allows selection of a display range, for example, selection of which part of a displayable area, for example, a central portion or a peripheral portion, displays an image or not.

The input reception section 60 receives an external signal from the wearer (operator) via an input operation section 70, which corresponds, for example, to the operation panel (not shown).

The internal memory 80 stores part of the contents of images to be projected, that is, a variety of data on video images having fixed contents, such as icons, dates, and a watch.

The main control circuit 51 performs, as an example of the centralized control on the action of the controller 50, a variety of processes according, for example, to a signal received by the input reception section 60. Among a variety of received signals, when recognizing a signal related, for example, to image processing, the main control circuit 51 transmits the signal to the image processing section 52.

Further, the main control circuit 51 reads as required or as appropriate part of information that will form an image signal to be sent from the image processing section 52, that is, information contained in the variety of data stored in the internal memory 80 and transmits the information to the image processing section 52.

In the present embodiment, the configuration described above, in which the image light GL is formed by the image formation unit IP (see FIG. 2), that is, the light output section 10 and the virtual image formation section 20, is designed to allow provision of video images recognized only when the wearer moves the eye EY or the line of sight in a specific direction by adjusting the light flux diameter, the light focus position (convergence position), and the angle of incidence of each light flux component of the image light GL and causing the adjusted light flux components to be incident on the iris of the eye EY.

A description will be made of the state of each light flux component that forms the image light PL, more specifically, the light flux diameter, the light focus position, the angle of incidence, and other states of each light flux component with reference to FIG. 5A and other figures. The relationship between each light flux component and the position where the eye is disposed will also be described. In the state shown in FIG. 5A, the wearer looks forward. That is, the line of sight extends along the −X direction, and a central axis EE1 of the line of sight from the eye EY coincides with the optical axis OA. It is assumed in the following description that a first sight line direction is a sight line direction along the forward direction, which is a reference direction, as described above, and that a second sight line direction is a sight line direction different from the first sight line, that is, a line of sight a central axis EE2 of which is inclined to the optical axis OA as shown, for example, in FIG. 6A.

Figure 5A:
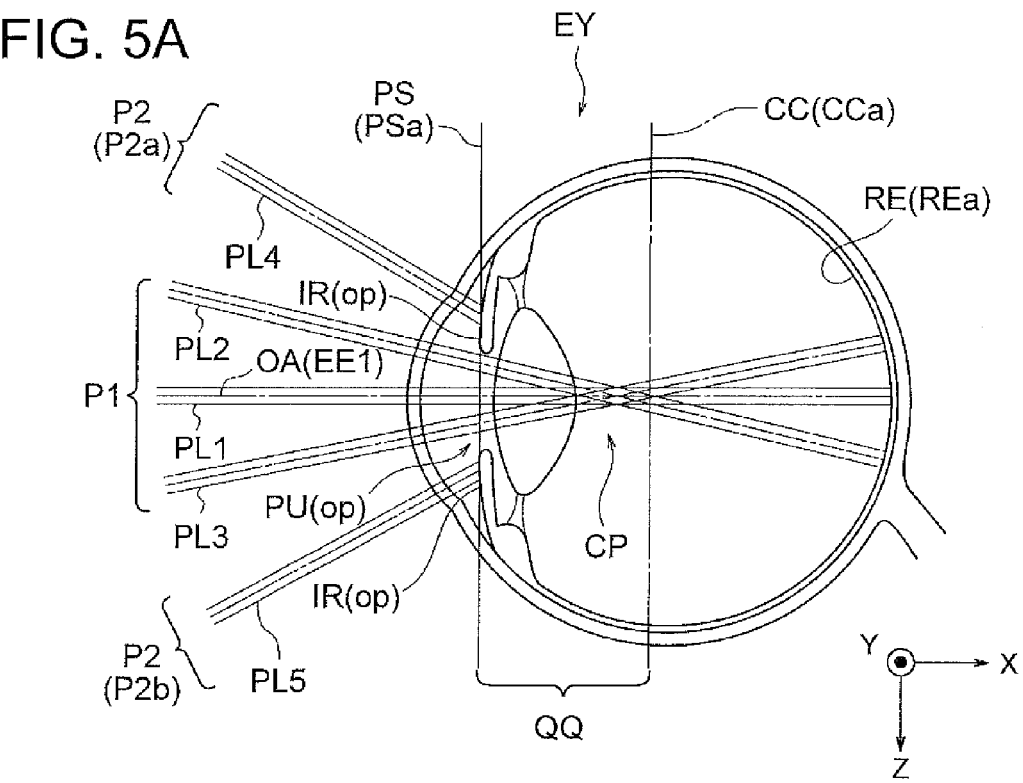
FIG. 5A shows light fluxes incident on an eye in a case where a wearer (user) faces forward, and FIG. 5B conceptually shows a range that is recognized by the wearer and a range that is not recognized by the wearer.
Figure 5B:
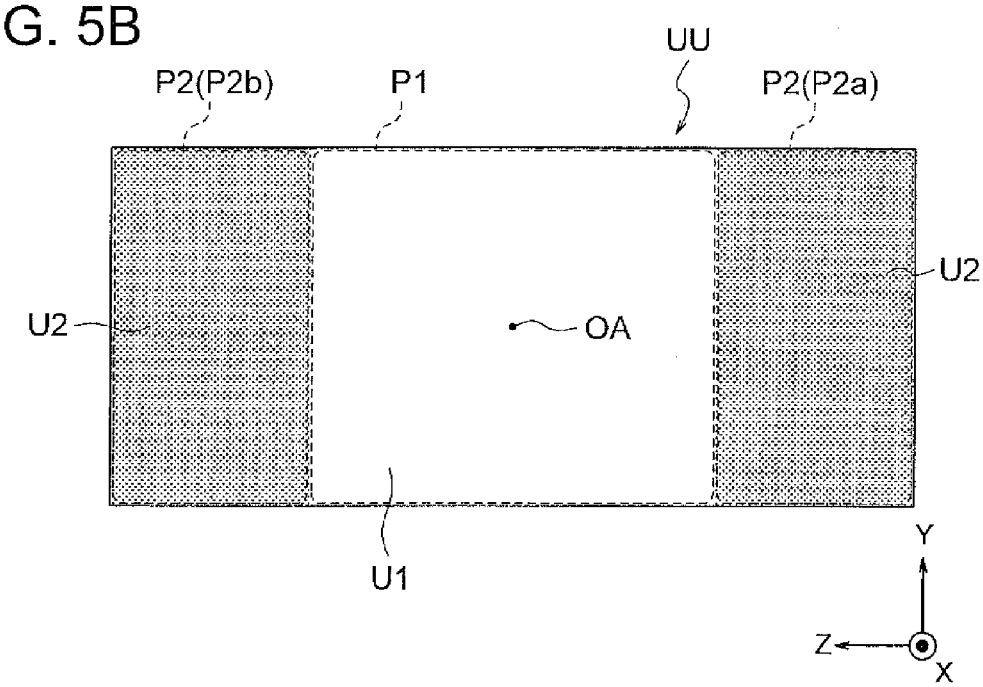

FIG. 5A shows light fluxes incident on the eye EY in a case where the wearer faces forward, that is, the wearer sets the eye EY facing in the first sight line direction. That is, FIG. 5A shows the relationship between the eye EY and a light flux incident from each pixel in a case where the wearer remains facing forward and the line of sight is not moved. FIG. 5B conceptually shows the range of video images that are recognized by the wearer and the range of video images that are not recognized by the wearer in the state shown in FIG. 5A. In the description, light flux components (partial light fluxes) that form the image light PL are defined by way of example as follows: A light flux component PL1 is a partial light flux incident along the optical axis OA as a central component; a light flux component PL2 is a partial light flux traveling in the vicinity of the light flux component PL1, having a relatively small angle of incidence, and incident from the right side of the wearer (−Z side); and a light flux component PL3 similar to the light flux component PL2 but incident from the left side (+Z side), as shown in FIG. 5A. Other light flux components are defined as follows: A light flux component PL4 is a partial light flux traveling in a peripheral area, having a relatively large angle of incidence, and incident from the right side of the wearer (−Z side); and a light flux component PL5 similar to the light flux component PL4 but incident from the left side (+Z side). It is assumed in the description that each of the light flux components PL1 to PL5 corresponds to a single pixel in formed video images.

The eye EY has not only the iris IR and the retina RE but also the cornea, the vitreous body, and other portions, and the pupil PU is formed at the center of the iris IR, as shown in FIG. 5A. It is assumed in the description that the diameter of each of the light flux components PL1 to PL5 is 3 mm or smaller. The thus set diameter of each of the light flux components PL1 to PL5, which is 3 mm or smaller, is smaller than the maximum diameter of the pupil PU of the eye EY of a typical person. When the diameter of each of the light flux components is set at a value smaller than the maximum diameter of the pupil PU, that is, each of the light flux components PL1 to PL5 corresponding to a pixel is sufficiently small, whether or not view video images are visible can be more precisely chosen in accordance with the state of the line of sight.

Whether or not each of the light flux components PL1 to PL5 reaches the retina RE, that is, the light flux component is recognized as video images by the wearer is determined by whether or not the light flux component is incident on the eye EY at an angle that allows the light flux component to pass through the pupil PU.

It is to be noted about the light flux components PL1 to PL5 and other light flux components, which form the image light PL, that a position CP where the principal rays thereof intersect one another is a position where the light flux components incident on the iris IR of the eye EY are concentrated within the narrowest range. That is, it can also be said that the position CP where the principal rays intersect one another is a position where the image light PL is focused or a position where the image light PL converges. In the present embodiment, the position CP where the principal rays intersect one another is not an iris position PS, where the iris IR is located, but a position shifted from the iris position PS toward the retina RE (downstream of iris position PS along optical path) but upstream of a center position CC of pivotal (rotating or turning) motion of the eye. In this case, since the light flux components PL1 to PL5 of the image light PL are not concentrated into a single point in the plane of the iris IR, some components can pass through the pupil PU of the iris IR and the other cannot pass through the pupil PU because they are blocked by the iris IR. As a result, the visible range changes in accordance with the line of sight of the wearer.

Consider the above description from a different point of view as a structure of the virtual image display apparatus 100 (see FIG. 1 and other figures) assembled on the assumption that the eye EY is disposed in a predetermined position. First, the following assumptions are made in the virtual image display apparatus 100 as shown in FIG. 5A: An intended iris position PSa (corresponding to iris position PS) is a position where the iris IR of the eye EY should be disposed; an intended eye center position CCa (corresponding to center position CC) is a position that should be the center of the eye EY; and a projection position REa is a position where the retina RE should be disposed, that is, where an image is focused. In this case, the virtual image display apparatus 100 has a structure in which the image light PL is so formed that the position CP, where the principal rays of the image light PL intersect one another, is disposed in a position shifted from the intended iris position PSa toward the projection position REa but upstream of the intended center position CCa, in other words, within a range QQ between the intended iris position PSa and a position downstream thereof in FIG. 5A.

Further, when it is assumed that the range of sight determined by the pupil PU of the iris IR, that is, an incidence opening OP, which corresponds to the attitude of the eye EY, is disposed in the intended iris position PSa, the virtual image display apparatus 100 can be so adjusted that the components of the image light PL contain components within an angular range that allows the components to reach the retina RE and the components within an angular range that does not allow the components to reach the retina RE in accordance with the attitude of the eye EY by controlling the light flux components of the image light PL in correspondence, for example, with the arrangement of the incidence opening OP and the projection position REa. In this case, the sight line direction of the wearer who wears the apparatus, such as the first sight line direction and the second sight line direction, means the direction along which the center of the incidence opening OP and the center of the projection position REa are arranged.

The light flux diameter and the angle of incidence of the image light PL are controlled in the virtual image display apparatus 100, specifically, in the image formation performed by the image formation unit IP, which is formed of the light output section 10, which outputs light, and the virtual image formation section 20, which reflects the light.

As a prerequisite for allowing the adjustment described above, the position of the wearer's eye EY needs to be aligned with the virtual image display apparatus 100 with a certain degree of precision. Since the position of the eye EY varies person to person, the virtual image display apparatus 100 may include an interpupillary distance adjuster and a member that allows adjustment of the height of the eye with respect to the virtual image formation section 20 and the distance thereto from the eye for positional adjustment made when the wearer wears the apparatus.

A description will next be made of the image light PL in detail in the state shown in FIG. 5A. First, in the state shown in FIG. 5A, the light flux components PL1 to PL5 are so adjusted that light flux components that pass through the pupil PU, reach the retina RE, and are recognized by the wearer are the light flux components PL1 to PL3, which travel in a central area. In other words, the light flux components PL4 and PL5, which travel in a peripheral portion, are so adjusted that they are blocked by the iris IR and cannot reach the retina RE or cannot be recognized. In this case, an entire display area UU is so recognized as conceptually shown in FIG. 5B that only an image within a central range (blank portion in FIG. 5B) is recognized but images within peripheral ranges (pearskin portion in FIG. 5B) are not recognized. In the following description, the recognized range (blank portion in FIG. 5B) is called a first area U1, and the non-recognized range (pearskin portion in FIG. 5B) is called a second area U2. In the state shown in FIG. 5A, an image in the central range, which corresponds to a narrow angle of view, can be incident on the eye EY and viewed as video images. On the other hand, an image in an area corresponding to a large angle of view, that is, video images in the peripheral ranges are blocked (cut off) by the iris IR, and hence do not reach the retina RE or are not viewed as video images. In the entire display area UU shown in FIG. 5B, the central area is called a first display area P1 and the right and left peripheral areas are called second display areas P2. That is, the first display area P1 is a range visible when the eye EY faces in the first sight line direction (forward direction), which is the reference direction, and the second display areas P2 are ranges invisible until the eye EY faces in the second sight line direction (angular ranges over which no light reaches retina RE when eye EY faces in first sight line direction). In the state shown in FIG. 5A, the first display area P1 substantially coincides with the first area U1, and the second display areas P2 substantially coincide with the second area U2.

It is assumed by way of example that the image light PL is so adjusted that the central first display area P1 is formed to fall within viewing angles of ±10° with respect to the first sight line direction, which corresponds to 0°. In this case, the wearer can more adequately capture video images displayed in the first display area P1 when the wearer faces in the first sight line direction (X direction), which is the reference direction. More specifically, when character information is, for example, displayed in the first display area P1 formed to fall within a relatively limited range of viewing angles of ±10°, the wearer can accurately read the information without having to move the light of sight but with the attitude maintained even when the character information is displayed across the first display area P1.

In the case where the wearer faces forward as shown in FIG. 5A, only video images projected in the first display area P1 are recognized but video images projected in the second display areas P2 are not recognized as described above, whereas when the wearer moves the line of sight, that is, when the direction in which the eye EY faces is changed, the range over which video images are recognizable changes. That is, since video images present in the direction to which the line of sight is moved pass through the pupil PU, the video images invisible when the wearer faces forward become visible.

Figure 6A:
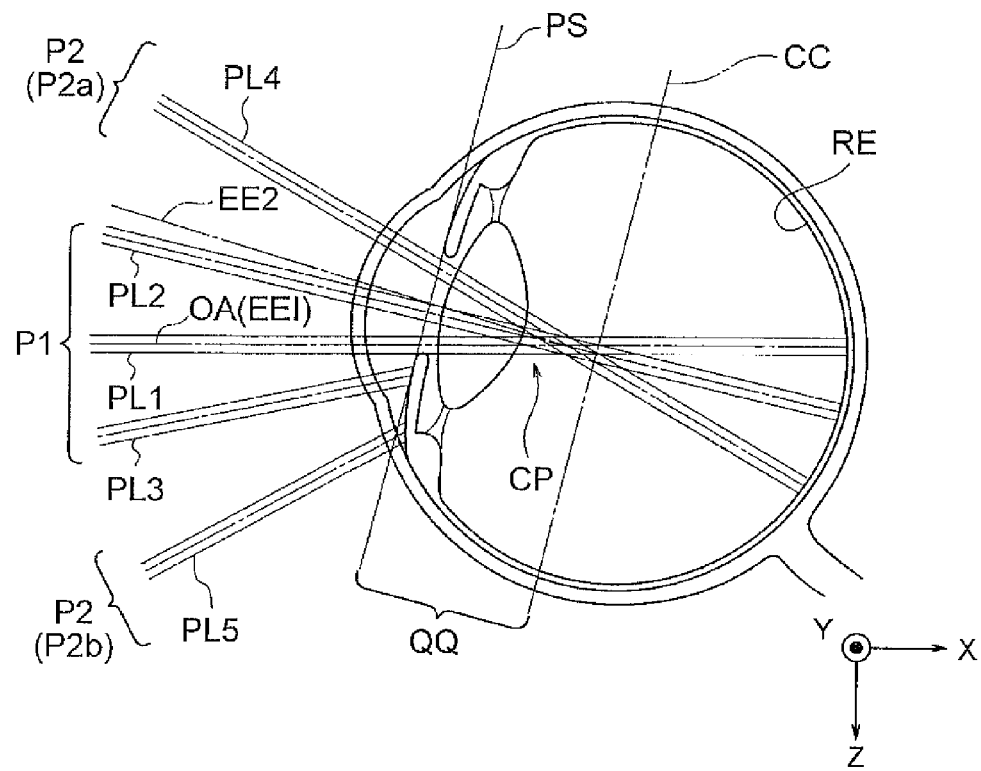
FIG. 6A shows light fluxes incident on an eye in a case where the wearer faces a peripheral portion, and FIG. 6B conceptually shows the range that is recognized by the wearer and the range that is not recognized by the wearer.
Figure 6B:
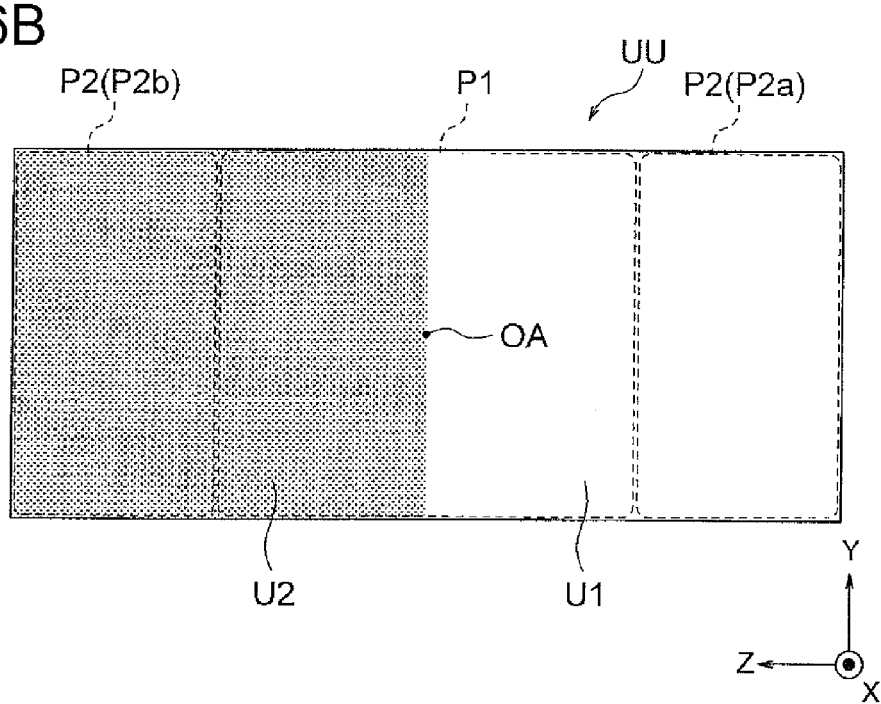

FIG. 6A shows light fluxes incident on the eye EY in a case where the wearer faces one of the right and left peripheral portions (peripheral portions in Z direction), specifically, the right (−Z side) peripheral portion, as an exemplary case where the wearer's eye EY faces in the second sight line direction different from the first sight line direction. In other words, FIG. 6A shows the relationship between the eye EY and a light flux incident from each pixel in a case where the wearer moves the line of sight from the state shown in FIG. 5A and observes the peripheral portion. FIG. 6B conceptually shows the range of video images that are recognized by the wearer and the range of video images that are not recognized by the wearer in the state shown in FIG. 6A. In this case, the light flux components are adjusted as follows: The light flux components PL1 and PL2 among the light flux components PL1 to PL3, which travel in a central area, are recognized; the right (−Z side) light flux component PL4 among the light flux components that travel in a peripheral area is recognized; and the central light flux component PL3 and the peripheral light flux component PL5 are blocked by the iris IR and cannot reach the retina RE or cannot be recognized, as shown in FIG. 6A. The situation described above is shown in FIG. 6B as follows: Only video images in a right (−Z side) partial area P2a of the right and left separate second display areas P2 and in substantially right-half the first display area P1 fall within the first area U1 (blank portion in FIG. 6B), which is recognized by the wearer; and video images in a left (+Z side) partial area P2b of the second display areas P2 and in substantially left-half the first display area P1 fall within the second area U2 (pearskin portion in FIG. 6A), which is not recognized by the wearer. Conversely, when the wearer faces one of the right and left peripheral portions (peripheral portions in Z direction), specifically, the left (+Z side) peripheral portion, only video images in the partial area P2b and in substantially left-half the first display area P1 are recognized.

As described above, in the present embodiment, the range over which an image is visible can differ between the state in which the wearer faces forward (in first sight line direction) shown in FIG. 5A and the state in which the wearer faces a peripheral portion (in second sight line direction) shown in FIG. 6A. Different video images can therefore be provided in accordance with the line of sight by changing the content of video images shown in each area. That is, the wearer can observe desired video images by moving the line of sight, whereas video images on the side opposite to the side to which the line of sight is moved or those that the wearer is not interested in are out of sight.

Figure 7A:
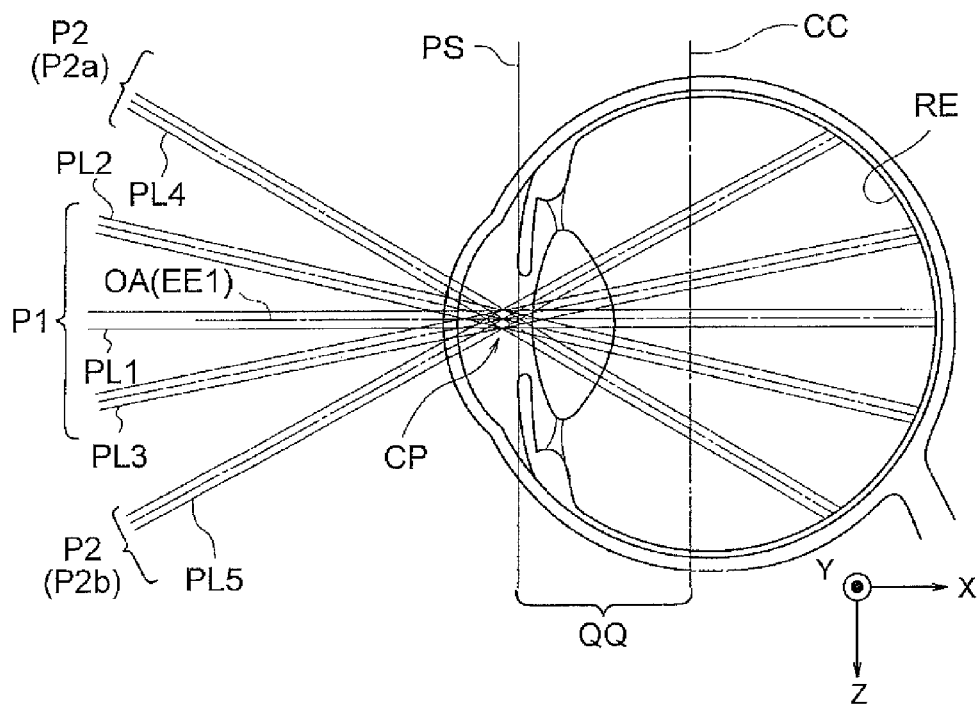
FIG. 7A shows a comparative example illustrating light fluxes incident on an eye in a case where the wearer faces forward.
Figure 7B:
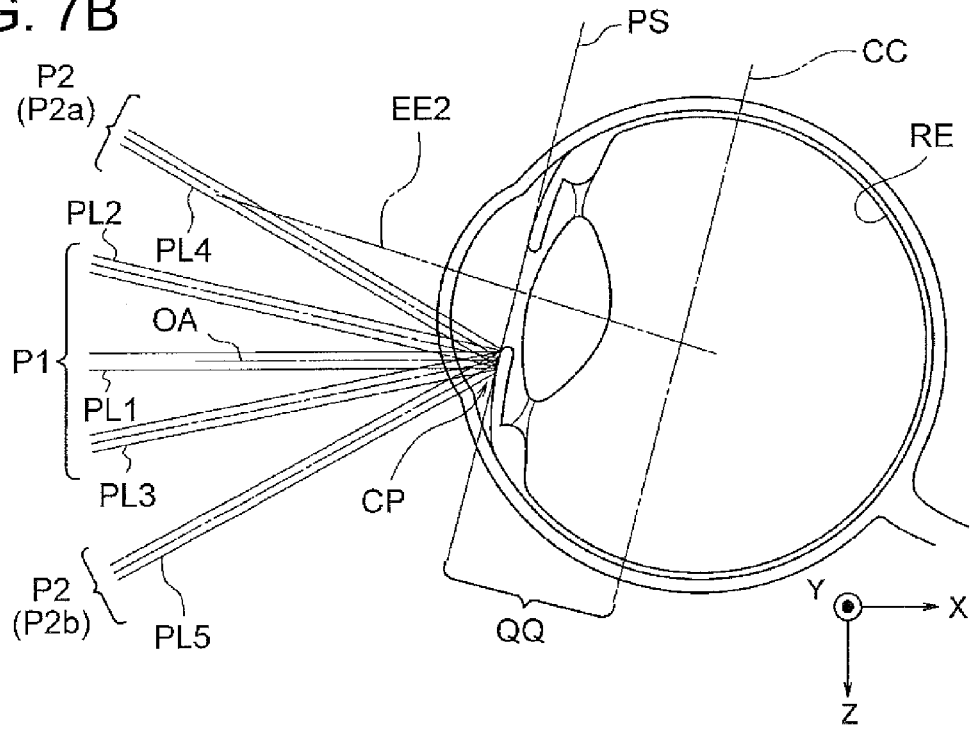
FIG. 7B shows the comparative example illustrating light fluxes incident on the eye in a case where the wearer faces a peripheral portion.

FIGS. 7A and 7B show a comparable example illustrating the sight in a case where the position CP, where the principal rays intersect one another, is in the vicinity of the position of the iris IR unlike the present embodiment described above. In this case, when the wearer faces forward (in first sight line direction), all the light flux components PL1 to PL5, which form the image light PL, reach the retina RE, that is, the entire display area is recognized, as shown in FIG. 7A. On the other hand, when the wearer moves the field of view by at least a certain angle or moves the eye EY in a direction different from the forward direction (in second sight line direction), all the light flux components PL1 to PL5 are blocked by the iris IR or the entire image is cut off, as shown in FIG. 7B. That is, video images present in a direction in which the wearer desires to face are cut off. In the present embodiment, in which the position CP, where the principal rays intersect one another, is located in a position shifted from the position of the iris IR and deeper in the eye EY (eyeball) as described above, the situation that occurs in the comparative example will not occur and the recognizable range can be changed in accordance with the change in the line of sight.

Figure 8:
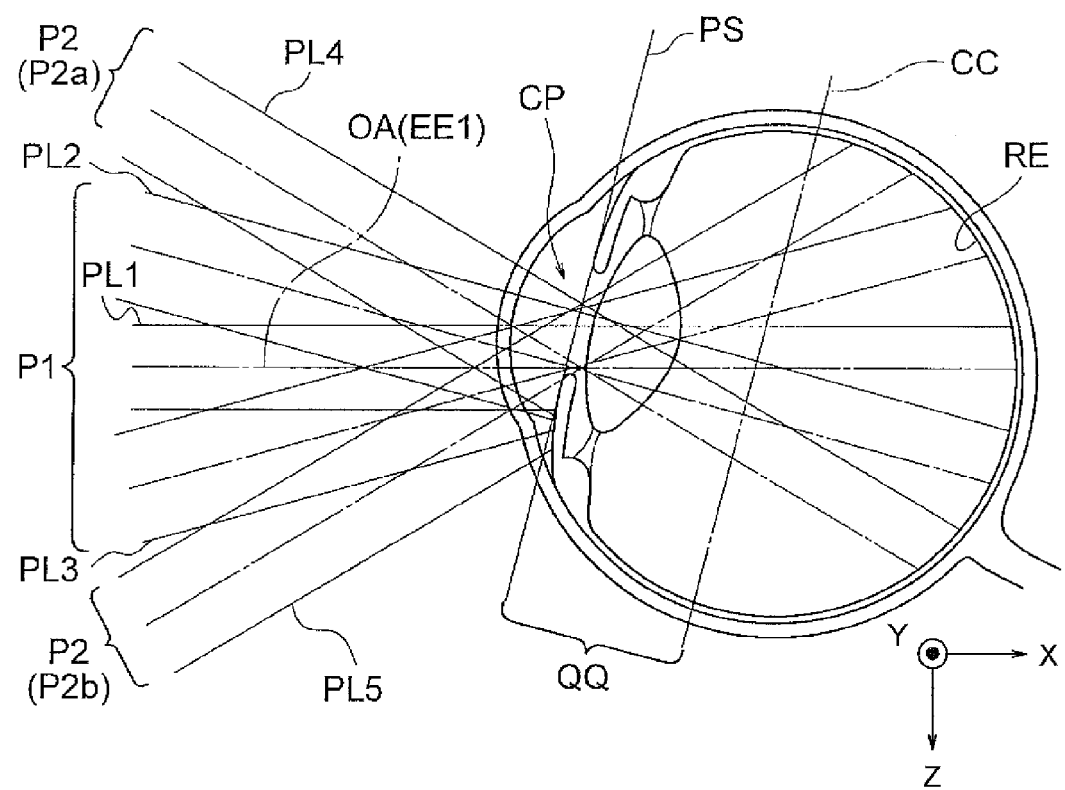
FIG. 8 shows light fluxes incident on an eye in another comparable example.

It is conceivable to enlarge the light flux diameter of each of the light flux components PL1 to PL5, as shown in FIG. 8. For example, enlarging the light flux diameter to a value sufficiently greater than the diameter of the pupil PU suppresses the amount of cut-off video images, whereas undesired video images are likely to remain in the sight even when the line of sight is moved. In the present embodiment, such a situation is avoided by setting the light flux diameter of each of the light flux components PL1 to PL5, for example, at 3 mm or smaller as described above, whereby the viewable range can be controlled.

Figure 9A:
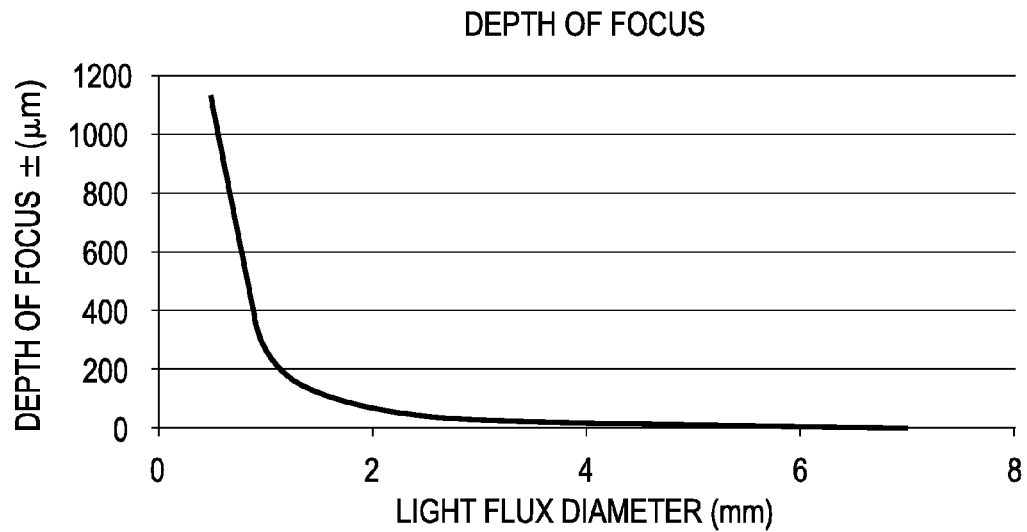
FIG. 9A is a graph showing the depth of focus on the human's eye side.
Figure 9B:
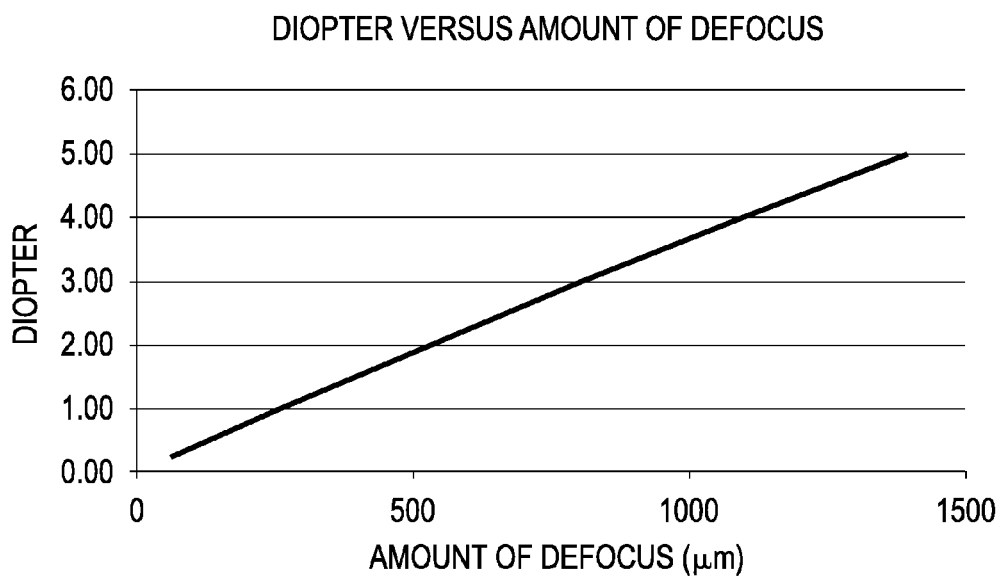
FIG. 9B is a graph showing diopter versus the amount of defocus.

Setting the light flux diameter at a small value as in the present embodiment further improves the depth of focus. FIGS. 9A and 9B are graphs for describing the depth of focus. More specifically, FIG. 9A is a graph showing the depth of focus on the eye side versus the light flux diameter. FIG. 9B is a graph showing diopter versus the amount of defocus. The following Table 1 shows the range of naked visual acuity versus diopter (dioptric power).

TABLE 1

|  | Dioptric power | Range of naked visual acuity |
|---|---|---|
| Myopia tenuis | −0.25 D | 1.2 to 0.8 |
|  | −0.50 D | 1.0 to 0.5 |
|  | −0.75 D | 1.0 to 0.4 |
| Myopia media | −1.0 D | 0.9 to 0.2 |
|  | −1.25 D | 0.8 to 0.1 |
|  | −1.5 D | 0.8 to 0.1 |
|  | −1.75 D | 0.7 to 0.08 |
| Myopia excessive | −2.0 D | 0.7 to 0.08 |
|  | −2.5 D | 0.5 to 0.06 |
|  | −3.0 D | 0.3 to 0.04 |
|  | −3.5 D | 0.3 to 0.04 |

As indicated by the graphs and the table, when the light flux diameter becomes smaller than or equal to 1 mm, for example, the depth of focus becomes about several hundreds of microns, which means that a target object can be brought into focus irrespective of the presence of an equivalent amount of defocus. The diopter corresponding to the value is about 2 to 3, as shown in FIG. 9B. In this case, the relationship between the diopter and the visual acuity shown in Table 1 indicates that satisfactory video images are provided with no diopter adjustment even for an eye having a visual acuity of about 0.1. On the other hand, when the light flux diameter is increased as shown, for example, in FIG. 8, the advantage in the diopter adjustment described above deteriorates. When the light flux diameter is, for example, about 5 mm, the depth of focus becomes substantially zero as indicated by the graph in FIG. 9A, and the diopter related to the amount of defocus shown in FIG. 9B also becomes substantially zero, resulting in no advantageous effect on the diopter adjustment resulting from the improvement in the depth of focus unlike the present embodiment.

As described above, in the virtual image display apparatus 100 according to the present embodiment, the image light PL is formed of the light flux components PL1 to PL5 having, for example, a light flux diameter of 3 mm or smaller, and the thus configured image light PL is caused to be incident on the iris of the eye EY for image formation in the form of a virtual image. Further, in this process, the image light is not concentrated into a single point when passing through the pupil of the eye because the position CP, where the principal rays of the partial light fluxes (light flux components) PL1 to PL5, which form the image light PL intersect one another, is located in a position shifted from the position of the iris of the eye EY toward a position downstream thereof along the optical path, that is, a position shifted toward the retina, whereby the range of the light flux components PL1 to PL5 that reach the retina can be changed in accordance with the motion of the eye. As a result, video images according to the line of sight of the wearer (wearer's intention) can be provided and video images from which the wearer averts the line of sight, that is, other unnecessary video images can be removed from the sight so that they do not interfere with the observation, for example, by controlling the image light PL in such a way that only image light components from a specific direction reach the retina RE of the eye EY in accordance with a change in the line of sight that occurs when the wearer moves the line of sight in the specific direction in order to observe specific video images.

Figure 10A:
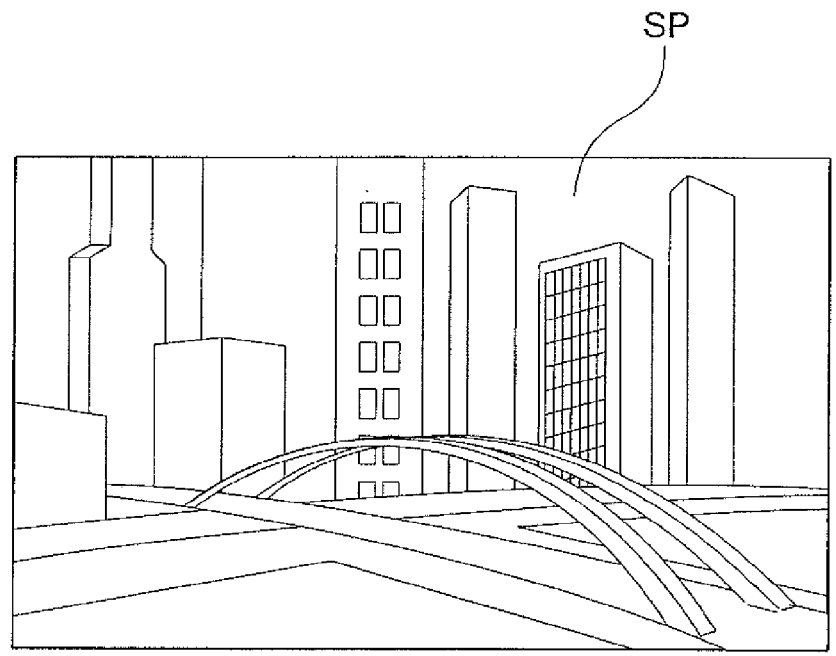
FIG. 10A shows a situation viewed by a wearer who wears a virtual image display apparatus according to a variation in a case where the wearer faces forward.
Figure 10B:
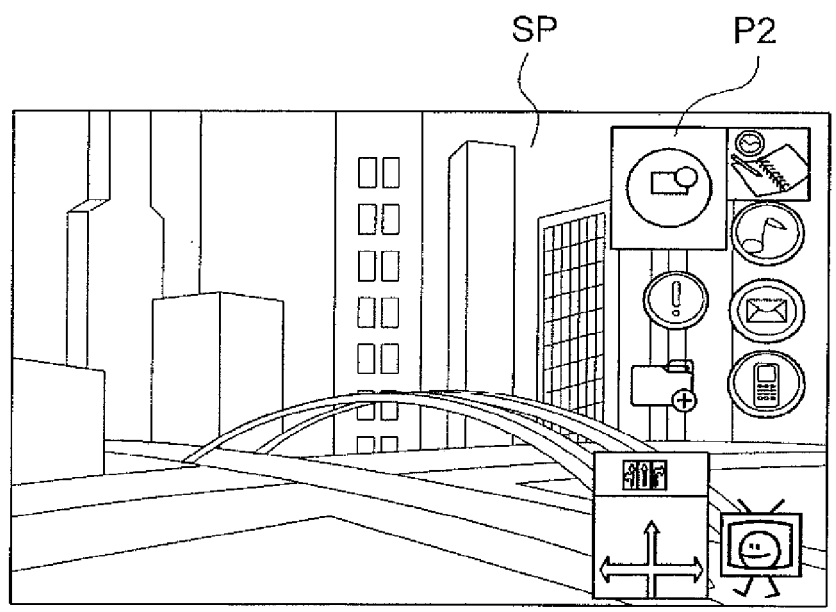
FIG. 10B shows a situation viewed by the wearer in a case where the wearer moves the line of sight outward.

A variation of the present embodiment will be described below. FIG. 10A shows a viewable range in a case where the wearer who wears the virtual image display apparatus according to the variation faces forward, that is, in a case where the eye EY faces in the first sight line direction. FIG. 10B shows a viewable range in a case where the wearer moves the line of sight outward, that is, in a case where the eye EY faces in the second sight line direction. In the present variation, video images are not usually displayed in a central portion (corresponding to video images displayed in first display area), whereas video images are usually displayed in a peripheral portion (corresponding to video images displayed in second display area). In this case, when the line of sight faces forward, the wearer observes an image formed by outside light SF, which shows a surrounding environment, in see-through observation as shown in FIG. 10A because no video images are displayed in the central portion. At this point, no light flux enters the sight although video images are displayed in the peripheral portion. On the other hand, when the line of sight is moved (sideways) to the peripheral portion, the contents of a variety of types of information displayed in addition to part of the image formed by outside light SF are visible because video images are displayed in the peripheral portion and the line of sight faces in a direction that allows the wearer to capture the displayed information, as shown in FIG. 10B. The variety of types of information displayed in the form of icons can be displayed as shown in FIG. 10B, for example, by reading information stored in the internal memory 80 shown in FIG. 4 as appropriate. An example of such usage corresponds to a state in which a person who wears the virtual image display apparatus and walks turns off central video images to achieve a state in which the wearer can see the outside. That is, when the line of sight faces forward, no peripheral video images are allowed to enter the eye EY because they obstruct observation. On the other hand, when map data or any other type of information is desired, the wearer moves the line of sight to allow video images hidden in the peripheral portion to appear. For example, a navigation screen can be brought to the center by issuing an instruction as appropriate based, for example, on audio or a pointer. Specifically, in the controller 50 shown in FIG. 4, the input operation section 70 transmits an instruction from the wearer based on any of the variety of methods described above. When the input reception section 60 receives a signal carrying the instruction, a signal related to corresponding image processing is transmitted via the main control circuit 51 to the image processing section 52, where the image signal is processed. In this process, the display selection section 52a also selects video images to be displayed, and the video images start being displayed at the center where no video images are usually displayed.

In the operation described above, when a specific signal is inputted, for example, the display selection section 52a may preferentially switch a currently displayed image to an image to be displayed in accordance with the specific signal irrespective of the instruction received by the input reception section 60. For example, although no video images are usually displayed at the center as described above, when a signal that notifies, for example, that the wearer will face an imminent danger is transmitted as the specific signal, emergency information can be displayed as video images at the center as higher-priority video image information than other types of video image information.

Second Embodiment

A virtual image display apparatus according to a second embodiment will be described below. The virtual image display apparatus according to the present embodiment is a variation of the virtual image display apparatus 100 according to the first embodiment and is the same as the virtual image display apparatus 100 according to the first embodiment unless otherwise specified.

Figure 11:
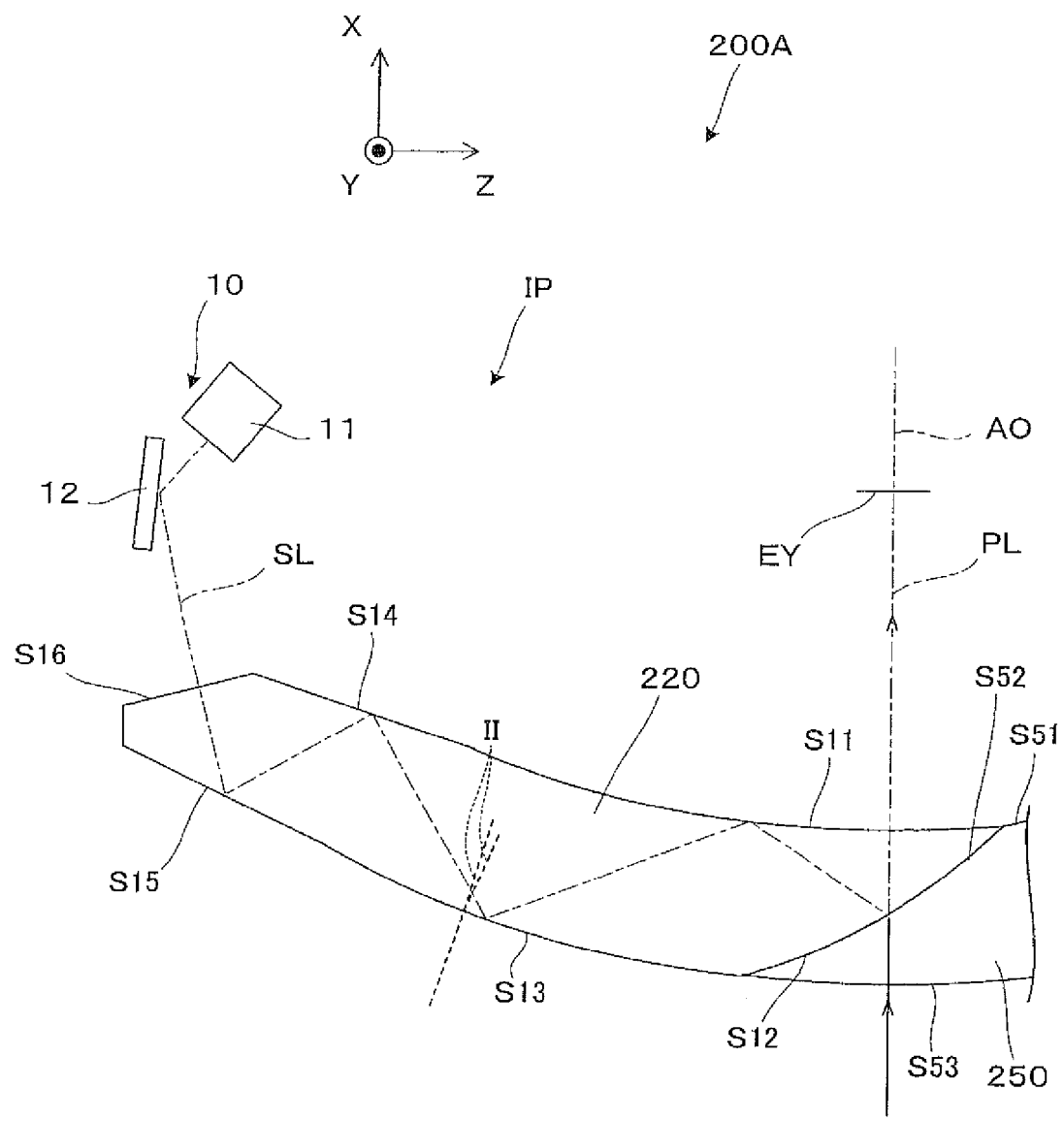
FIG. 11 is a plan view of a virtual image display apparatus according to a second embodiment.

FIG. 11 is a plan view of the virtual image display apparatus according to the present embodiment. As shown in FIG. 11, a first display unit 200A of a virtual image display apparatus 200 according to the present embodiment includes a light output section 10, a light guide member 220, which is a virtual image formation section, and a light transmissive member 250. The light guide member 220 and the light transmissive member 250, each of which is a light transmissive prism member, are bonded to and integrated with each other. The light output section 10 and the light guide member 220 cooperate with each other and function as an image formation unit IP, which forms an image in the form of a virtual image.

The light guide member 220 is an arcuate member curved along the wearer's face in a plan view and has first to sixth surfaces S11 to S16 as side surfaces having optical functions sequentially arranged from the light exiting side. The surfaces are disposed as follows: The first surface S11 and the fourth surface S14 are adjacent to each other; the third surface S13 and the fifth surface S15 are adjacent to each other; the second surface S12 is disposed between the first surface S11 and the third surface S13; and the sixth surface S16 is disposed between the fourth surface S14 and the fifth surface S15. The surfaces S11 to S16, each of which is a free-form surface, guide scan light SL having exited out of the light output section 10 into the light guide member 220 based on total reflection using mirrors and total reflection using inner surfaces based on a difference in refractive index between each surface and an air layer and adjust the optical path of the scan light SL to output it as image light PL, which will form a desired virtual image. That is, the light guide member 220 is a prism member that functions as a virtual image formation section. The guided light forms an intermediate image in a position labeled as an image plane II before or after the light travels via the third surface S13.

The light transmissive member 250 is a member (auxiliary prism) that assists a see-through function of the light guide member 220, is made of the same material of which the light guide member 220 is made, and has a first transmissive surface S51, a second transmissive surface S52, and a third transmissive surface S53 as side surfaces having optical functions. The second transmissive surface S52 is disposed between the first transmissive surface S51 and the third transmissive surface S53. The first transmissive surface S51 is a curved surface that coincides with an extension of the first surface S11 of the light guide member 220. The second transmissive surface S52 is a curved surface bonded to and integrated with the second surface S12 via an adhesive layer. The third transmissive surface S53 is a curved surface that coincides with an extension of the third surface S13 of the light guide member 220. The second transmissive surface S52 and the second surface S12 of the light guide member 220, which are bonded to and integrated with each other, have shapes having substantially the same curvature.

In the light guide member 220, each of the first surface S11 and the third surface S13 is disposed in front of the eye EY and has a concave shape toward the viewer, and the diopter is substantially zero when the viewer observes outside light through the first surface S11 and the third surface S13. In the light transmissive member 250, the first transmissive surface S51 and the third transmissive surface S53, which coincide with extensions of the first surface S11 and the third surface S13 respectively, also provide a diopter of about zero. That is, the integrated light guide member 220 and light transmissive member 250 as a whole also provide a diopter of about zero.

In the present embodiment as well, when the image formation unit forms an image in the form of a virtual image, adjusting the light flux diameter and the light focus position (convergence position) of the image light allows the range of the light flux components that reach the retina to be changed in accordance with the motion of the eye. As a result, video images according to the line of sight of the wearer (wearer's intention) can be provided and video images from which the wearer averts the line of sight, that is, other unnecessary video images can be removed from the sight so that they do not interfere with the observation.

The invention is not limited to the embodiments described above and can be implemented in a variety of other aspects to the extent that they do not depart from the substance of the invention.

In the above description, the light output section 10 is formed of a MEMS mirror and other components, but image projection is not necessarily performed based on the MEMS mirror configuration. For example, in an apparatus in which a liquid crystal panel, an organic EL, or any other similar device is used to form an image, the correction may be made in the same manner described above.

Further, in the structure of the signal light modulator 11 shown in FIG. 3A and other figures described above, the combined light formation portion 11a combines the light fluxes from the color light sources 11r, 11g, and 11b with one another to form the signal light GL. The configuration described above is an example of the signal light formation in the present embodiment, and the signal light GL can be formed based on any other configuration.

In the above description, a diode laser light source or an LED light source is used as each of the light sources, but each of the light sources may be any other device based, for example, on organic EL.

Further, in the virtual image display apparatus 100 according to the first embodiment described above, two light output sections 10 form right and left images, as shown in FIG. 2. For example, a single MEMS mirror may be configured to cover both the right and left sides to form video images on the right and left sides.

Further, in the above description, the range of video images recognized in the rightward/leftward direction changes in accordance with the attitude of the eye EY. The range of video images recognized in the upward/downward direction may alternatively change in accordance with the attitude of the eye EY.

The virtual image formation section 20 in the first embodiment described above receives the scan light SL having exited out of the scan system 12 and reflects the scan light SL to allow the wearer to recognize the scan light SL. The virtual image formation section 20 may instead be provided with a hologram element, which is a film-shaped member, for image formation. That is, diffraction in the hologram element can be used to form a virtual image based on image light of a specific wavelength band, and outside light of a wide wavelength band may be allowed to pass through the hologram element for see-through observation.

The entire disclosure of Japanese Patent Application No. 2012-253929, filed Nov. 20, 2012 is expressly incorporated by reference herein.

What is claimed is:

1. A virtual image display apparatus comprising an image formation unit that causes image light having a predetermined light flux diameter to be incident on the iris of a user's eye so as to allow the user to visually recognize an image in the form of a virtual image,
    wherein the image formation unit, when forming the image light, sets a position where principal rays of light flux components of the image light incident on the iris of the eye intersect one another to be a position (i) shifted away from an intended iris position where the iris of the eye is to be disposed toward a projection position where the retina of the eye is to be disposed but (ii) upstream of an intended center position corresponding to the center of pivotal motion of the eye.

2. The virtual image display apparatus according to claim 1,
    wherein the image formation unit adjusts the predetermined light flux diameter in such a way that the diameter of each of the light flux components that corresponds to a pixel is smaller than a maximum diameter of the pupil of the eye.

3. The virtual image display apparatus according to claim 1,
    wherein the image formation unit adjusts the predetermined light flux diameter in such a way that the diameter of each of the light fluxes components that corresponds to a pixel is 3 mm or smaller.

4. The virtual image display apparatus according to claim 1,
    wherein the image formation unit sets a reference direction to be a normal vision direction of the eye of the user who wears the apparatus and outputs the image light having a predetermined angular range with respect to the normal vision direction to cause the image light to be incident on the intended iris position in such a way that the components of the image light contain components within an angular range that allows the components to reach the projection position corresponding to the position of the retina of the eye and components within an angular range that does not allow the components to reach the projection position in accordance with where an incidence opening corresponding to the attitude of the eye is disposed.

5. The virtual image display apparatus according to claim 1,
    wherein the image formation unit has a first display area that outputs light within an angular range that allows the light to reach the projection position when the eye faces in a first sight line direction corresponding to the normal vision direction of the eye of the user who wears the apparatus and a second display area that outputs light within an angular range that allows the light to reach the projection position when the eye faces in a second sight line direction different from the normal vision direction, and the image formation unit allows visual recognition of a virtual image formed by the image light in at least one of the first and second display areas.

6. The virtual image display apparatus according to claim 5,
    wherein the second display area of the image formation unit outputs light within an angular range that does not allow the light to reach the projection position when the eye faces in the first sight line direction.

7. The virtual image display apparatus according to claim 5,
    wherein in the image formation unit, the first display area is formed with respect to the first sight line direction corresponding to 0° in such a way that the first display area falls within viewing angles of ±10°.

8. The virtual image display apparatus according to claim 5, further comprising:
    an input reception section that receives an instruction from a wearer; and
    a display selection section that allows selection of whether or not image formation is performed at least in one of the first display area and the second display area of the image formation unit in accordance with the instruction from the input reception section.

9. The virtual image display apparatus according to claim 8,
    wherein when a specific signal is inputted, the display selection section preferentially displays an image according to the specific signal irrespective of the instruction received by the input reception section.

10. The virtual image display apparatus according to claim 1, wherein the retina of the eye is disposed within a range between the intended iris position and the projection position where the retina of the eye is to be disposed.

11. A virtual image display apparatus comprising:
    an image formation unit that causes image light having a predetermined light flux diameter to be incident on the iris of an eye so as to allow visual recognition of a virtual image, wherein when the display apparatus is worn and the line of sight from the eye faces in a specific direction:

the image formation unit allows visual recognition of the image light in such a way that the image light contains a component that is outputted at an angle that allows a part of the component and does not allow another part of the component to reach a position corresponding to the retina of the eye, and the image formation unit, when forming the image light, sets a position where principal rays of light flux components of the image light incident on the iris of the eye intersect one another to be a position (i) shifted away from an iris position where the iris of the eye is disposed toward the position corresponding to the retina of the eye but (ii) upstream of a center position corresponding to the center of pivotal motion of the eye.

\* \* \* \* \*